(12) United States Patent
Lin

(10) Patent No.: US 8,407,692 B2
(45) Date of Patent: Mar. 26, 2013

(54) DYNAMIC CORRECTION OF COMPONENT MANIFESTS

(75) Inventor: Eugene Lin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1287 days.

(21) Appl. No.: 11/823,175

(22) Filed: Jun. 27, 2007

(65) Prior Publication Data

US 2009/0007093 A1     Jan. 1, 2009

(51) Int. Cl.
*G06F 9/445* (2006.01)

(52) U.S. Cl. ....................................................... 717/174

(58) Field of Classification Search ..................... 717/174
See application file for complete search history.

(56) References Cited

U.S. PATENT DOCUMENTS

| | | | |
|---|---|---|---|
| 6,289,512 B1 | 9/2001 | Edwards et al. | |
| 6,363,524 B1 | 3/2002 | Loy | |
| 6,999,976 B2 * | 2/2006 | Abdallah et al. | 717/118 |
| 7,069,554 B1 * | 6/2006 | Stammers et al. | 717/178 |
| 7,155,713 B1 * | 12/2006 | Burkhardt et al. | 717/175 |
| 7,281,254 B2 * | 10/2007 | Santo et al. | 720/616 |
| 7,287,253 B2 * | 10/2007 | Yamamura et al. | 717/176 |
| 7,512,635 B1 * | 3/2009 | Solin | 717/168 |
| 7,574,706 B2 * | 8/2009 | Meulemans et al. | 717/174 |
| 7,814,551 B2 * | 10/2010 | Darweesh et al. | 726/26 |
| 7,904,900 B2 * | 3/2011 | Forsyth | 717/178 |
| 7,934,210 B1 * | 4/2011 | Stampfli et al. | 717/168 |
| 8,060,856 B2 * | 11/2011 | Besbris et al. | 717/165 |
| 2003/0037325 A1 * | 2/2003 | Hargrove et al. | 717/175 |
| 2003/0182652 A1 * | 9/2003 | Custodio | 717/122 |
| 2004/0003389 A1 * | 1/2004 | Reynar et al. | 717/178 |
| 2004/0034850 A1 * | 2/2004 | Burkhardt et al. | 717/120 |
| 2004/0128583 A1 | 7/2004 | Iulo et al. | |
| 2004/0250247 A1 | 12/2004 | Deeths et al. | |
| 2005/0262501 A1 | 11/2005 | Marinelli et al. | |
| 2006/0010345 A1 | 1/2006 | Schnoebelen et al. | |
| 2006/0143515 A1 | 6/2006 | Kuramkote et al. | |
| 2006/0224544 A1 | 10/2006 | Keith, Jr. | |
| 2007/0006014 A1 | 1/2007 | Huang | |
| 2007/0050679 A1 | 3/2007 | Reddy | |
| 2008/0141225 A1 * | 6/2008 | Bostick et al. | 717/128 |

OTHER PUBLICATIONS

Awerbuch et al. "Self-stabilization by local checking and correction", Jul. 16, 1997, IEEE.*
Banga, Gaurav, "Auto-Diagnosis of Field Problems in an Appliance Operating System", Date: 2000.
Whitaker, et al., "Configuration Debugging as Search: Finding the Needle in the Haystack".

* cited by examiner

*Primary Examiner* — Wei Zhen
*Assistant Examiner* — Junchun Wu
(74) *Attorney, Agent, or Firm* — Powell IP Law, PLLC

(57) ABSTRACT

Described is processing a manifest associated with a software component (such as for installation purposes) to determine whether the manifest has errors, and if so, providing a corrected manifest. To process the manifest, an identifier associated with the manifest is used to consult a correction data store to determine whether the manifest is known to require correction. The identifier may be generated via a hash (e.g., of the manifest contents) if one is not appropriately associated with the manifest. If the manifest is known to require correction, a corrected manifest is used, such as from a substitute corrected manifest, or a set of deltas that modify the manifest into the corrected manifest. The substitute manifest or deltas may be in the data store or obtained via a link. A corrected manifest may also be provided by evaluating the manifest for rule violations, and fixing any rule violations that are found.

18 Claims, 6 Drawing Sheets

DYNAMIC CORRECTION OF COMPONENT MANIFESTS

BACKGROUND

In contemporary computing, an installable software component generally includes a description of its constituent parts, such as code files, resource files, configuration settings, dependencies and execution requirements. This description referred to as a manifest. For example, in the Windows® Vista™ operating system, operating system components have manifest files (.MAN files), device drivers have INF files, and Windows® Installer applications have MSI files. Each of these file types is a specific example of a manifest.

The operating system (or installer component) relies on accurate information in the component manifest in order to properly install and maintain the installation state of a component. The manifest provides this information to the installer, and the installer's job at installation time is to transform the component from its distribution form (which may be a compressed archive, for example) into its runtime form. If the manifest information is not correct, such as due to an authoring error, the installer believes it succeeded in installing the component, when in fact the error may cause the component to fail to properly execute. An error in a single component's manifest can impact the proper operation of other components that depend on it. An error can also cause working components to be replaced by a non-working component.

Sometimes, component developers make errors in their development that result in incorrect information in the component's manifest. At other times, the definition of a manifested property becomes stricter at a later time. For example, an API contract may not be precise enough about the speed at which the API returns its result. A component developer may author a component to that API contract, only to discover later that the API contract was clarified to specify a performance requirement that cannot be satisfied. In either case, if the component has already shipped with an error or errors in its manifest, problems will occur. The developer may choose to correct the errors in a future release of the component, but that does not help customers to whom the component has already shipped.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology that processes a manifest to determine whether the manifest has one or more associated errors, and if so, provides a corrected manifest, such as for use in installing a software component. To process the manifest, an identifier associated with the manifest may be used to consult a correction data store to determine whether the manifest is known to require correction. The identifier may be generated via a hash (e.g., of the manifest contents) if one is not appropriately associated with the manifest.

If the manifest is known to require correction, a corrected manifest is used in its place, such as a substitute corrected manifest provided from the data store (or found via a link in the data store), or by building the corrected manifest from one or more deltas (including patches) applied to the manifest. The deltas may likewise be in the data store or found via a link in the data store.

A corrected manifest may also be provided by processing the manifest to evaluate the manifest for rule violations. A rules engine and/or the correction data store may include a set of one or more rules, and when a rule violation exists, the manifest contents may be changed to fix the rule violation, resulting in outputting a rules-corrected manifest.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards dynamically detecting and correcting manifest errors, to hide the errors from any calling component. As will be understood, such dynamic detection and correction may be performed in various ways, including by checking a unique identifier associated with the manifest (e.g., a strong ID or hash) to determine whether a substitute corrected manifest exists, applying deltas and/or a patch to a manifest, and/or applying rules to correct errors in a manifest, such as commonly occurring errors discovered during a parsing operation that can be simply fixed by changing the parsing output.

As will be understood, various examples are shown herein that facilitate the above concepts and aspects. However, these are only non-limiting examples for the purposes of describing the technology. As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing technology in general.

Figure 1:
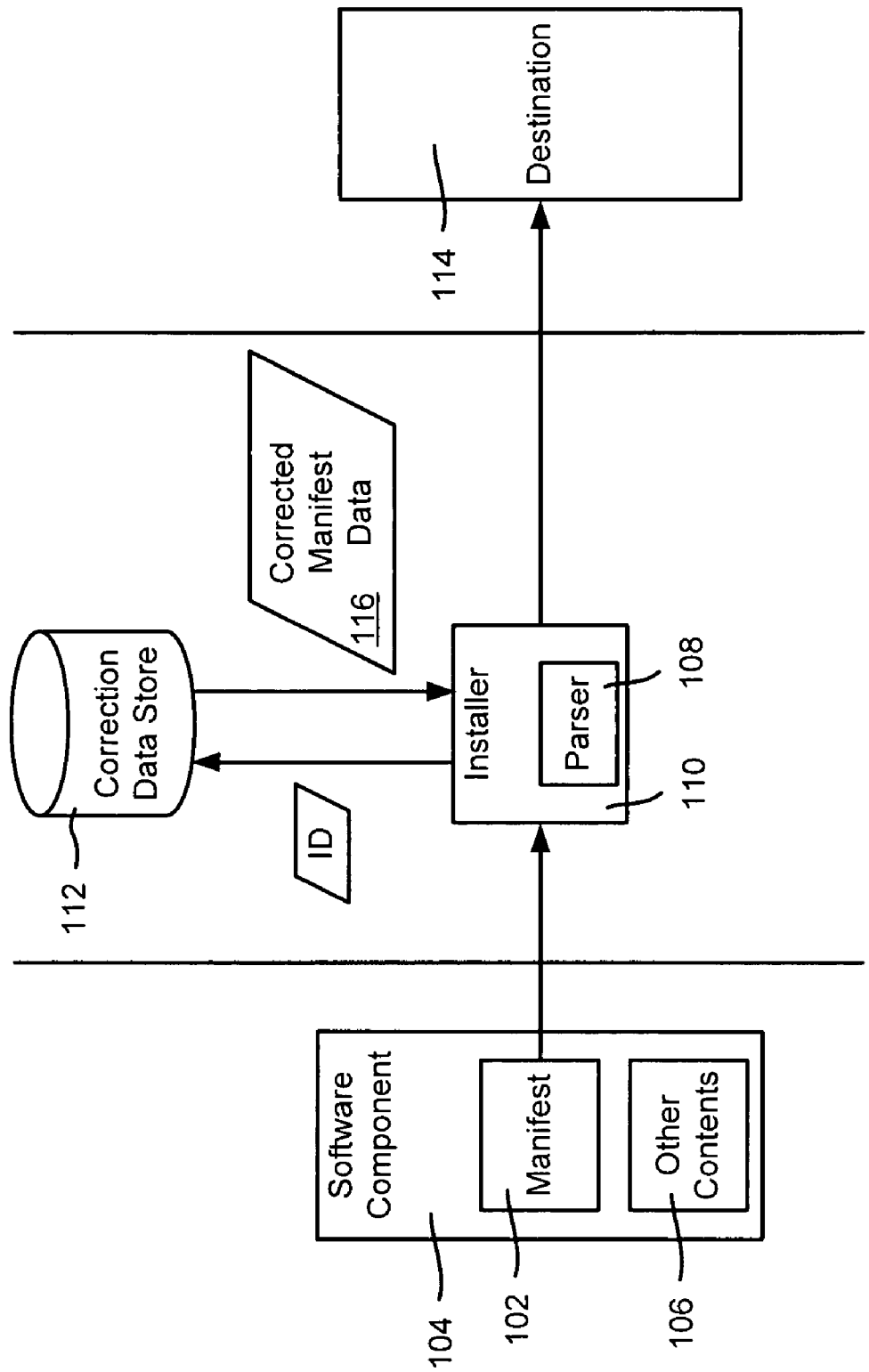
FIG. 1 is an example block diagram representing the general concept of dynamically checking a manifest to determine whether a corrected manifest is available to use in installation of a software component.

Turning to FIG. 1, there is shown a block diagram representing general concepts related to dynamic correction of component manifests. In this example, a distribution source provides the manifest 102 as part of a software component 104 including other content 106 to install. During installation, an installer 110 including a parser 108 parses the manifest 102 and installs the component 104 (and/or its other contents 106) to a final destination 114.

Unlike a conventional installer, the installer 110 is able to dynamically correct errors in manifests. In the example of FIG. 1, a set of manifests known to have errors have descriptions for them (e.g., identifiers/indexes) encoded into a correction data store 120. Examples of identifiers include strong IDs associated with a manifest, or a hash of the manifest contents.

Thus, in this example implementation, whenever a component 104 is installed, the installer 110 consults the correction data store 112 to detect whether that component's manifest 102 contains any known errors. If so, the installer 110 accesses the correction data store 112 to obtain corrected manifest data 116 to correct those errors and mask them from any other components. In other words, the installer 110 treats the component 104 as if it had the corrected manifest instead of the component-provided manifest 102 with the error or errors.

For example, if a component's manifest has a problem, an installer 110 that implemented this process may dynamically substitute a corrected manifest from the correction data store 112 in place of the problematic manifest 102, before the installer performed any actions based on the problematic manifest. As a result, the installed component 104 works properly and other components in the system are unaffected by the previous error. Note that for any manifest identified as having an error, the correction data store 112 may contain a substitute manifest, the deltas needed to correct a manifest, a link to a remote copy of the corrected manifest or deltas, and so forth. For example, given a link to some source location, the installer or other manifest reader obtains the corrected manifest by some retrieval means, for example by downloading it from a network or copying it from media. As such, FIG. 1 refers to "corrected manifest data" 116 which represent any or all of these alternatives.

Note that performing the correction in the installer 110 allows for correcting manifests not only during installation, but also during other software management operations such as uninstallation, upgrade, migration, rollback and repair. Further, in some operating systems, it may be simpler to implement manifest correction in the installer component than in another component, such as a decoupled manifest reader component described below with reference to FIG. 2.

Figure 2:
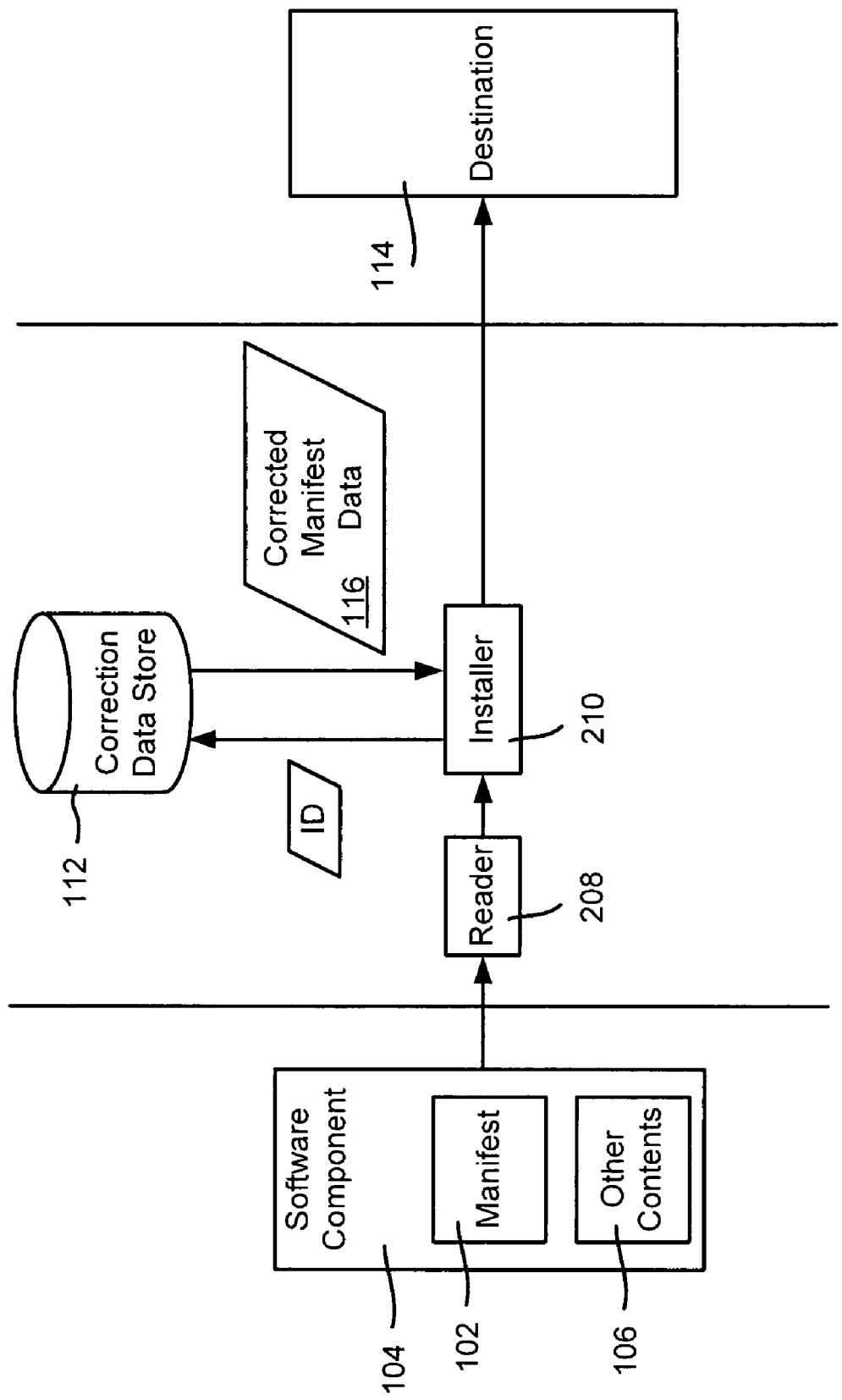
FIG. 2 is an alternative example block diagram representing the general concept of dynamically checking a manifest to determine whether a corrected manifest is available to use in installation of a software component.

FIG. 2 is an alternative implementation in which the manifest reader component 208 has been separated from the installer 210. In general, the reader 208 of FIG. 2 may operate very similarly to the installer 110/parser 108 of FIG. 1, and access a data store 112 to obtain the corrected manifest data 116 (in any of its forms).

To this end, the manifest reader 208 consults the data store 112 whenever a manifest 102 is read. It is commonly accepted practice that manifests are never directly read by other components, but instead read via a single abstraction layer that includes the manifest reader 208. As described herein, the manifest reader 208 consults the data store 112 to determine whether the manifest 102 being read contains a previously-identified error. If the manifest 102 being read contains an error, the manifest reader 208 uses the correction information 116 in the data store 112 to fix the manifest before its information is presented to the calling component. As a result, the calling component is never exposed to any of the incorrect information in the manifest 102. The calling component only sees the information that the reader would have returned from a corrected manifest. In other words, because the manifest reader 208 abstracts the calling component from the manifest 102, the manifest reader 208 hides all errors in the manifest from calling components.

While the implementations of FIGS. 1 and 2 generally differ only in where the correction work is performed, it can be seen that the implementation of FIG. 2 provides the benefit of dynamic manifest correction for non-installer components that are reading information from manifests for other (non-installation or management) purposes. Moreover, this implementation allows the manifest reader 208 to be easily updated separately of the installer code.

One benefit is that a reader 208 could be hard coded or otherwise written with a rules engine (e.g., to access the data store 112) to pre-process a manifest's contents against a set of rules, looking for rule violations (errors). The reader 208 could correct such rule violations in its output to the installer 210, which would then install based on a corrected manifest. As mentioned above, the output alternatively could be to another component instead of an installer.

Figure 3:
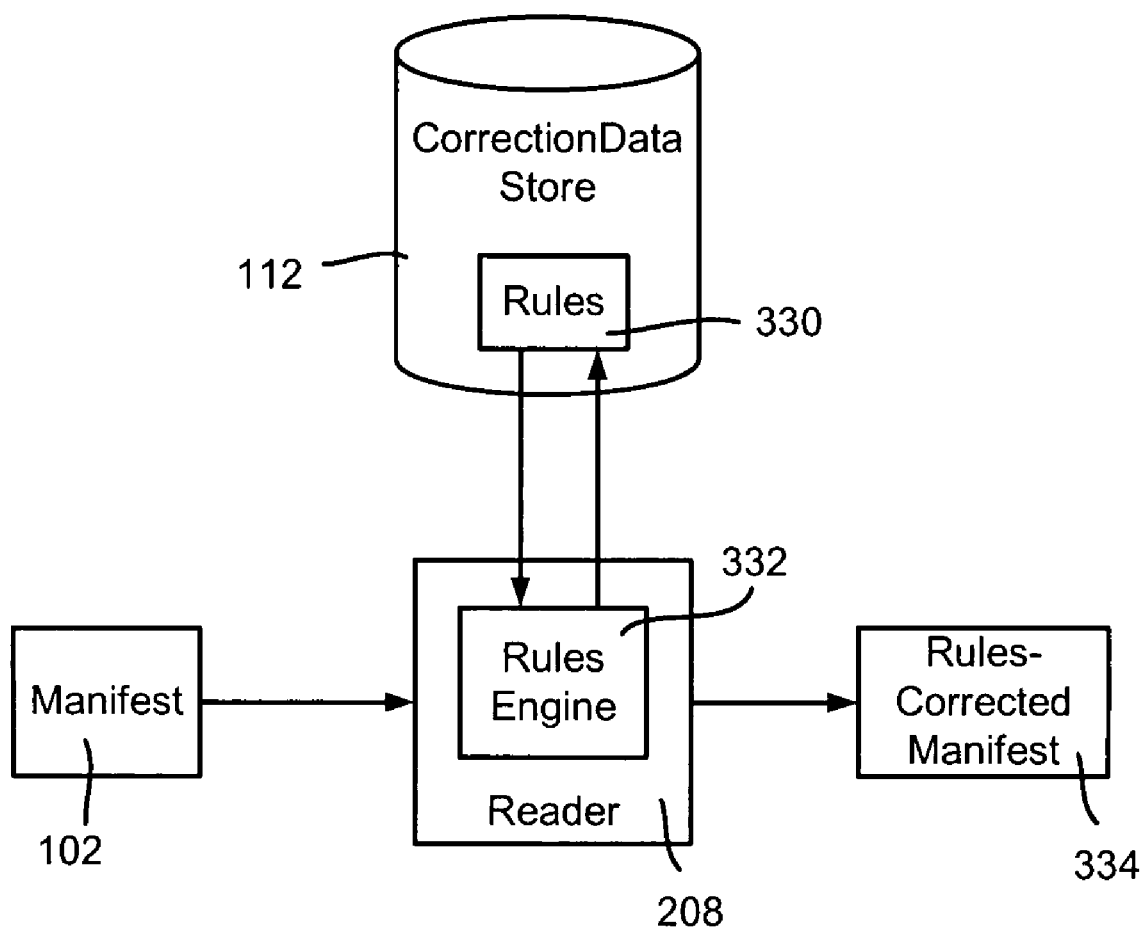
FIG. 3 is a block diagram exemplifying the checking of a manifest for rules violations prior to use in installation of a software component.

FIG. 3 shows an example of such rule checking.

Note that the data store 112 may contain a set of rules 330 for algorithmically identifying specific types of manifest errors, and/or the manifest reader 208 may contain the rules directly (such as very common ones). In any event, as the manifest reader 208 reads or preprocesses the manifest in an error-checking pass, the manifest reader applies these rules via a rules engine 332 to determine whether the input manifest 102 has an error. If so, a rules-corrected manifest 334 is output by the reader 208, such as via one or more buffers.

By way of example, a common mistake when authoring a manifest is to omit a media identifier with respect to a file location. When parsing, a list of source files is built and enumerated. If a file is if not listed, the reader can automatically modify the manifest data to list the file, and/or to point to the source disk for that file, which is known.

As can be readily appreciated, various concepts and aspects may provide further benefits. For example, a later manifest correction can be used to retroactively update earlier components; one manifest can add a rule set or data set to the store for use by another component, delete rules and so forth. An operating system version or the like may contain an updated version of the data store, for example, or a component can provide a new manifest or new manifest data for a related component. For a corrected manifest for a different component, the reader/installer may automatically re-install that component using the corrected manifest. When a new rule comes in, the reader/installer may automatically re-install other components while applying the new rule.

As further examples, the database may be a resource that is shipped with the manifest reader component or installer component. Alternatively, the database may reside in a remote location on a network, and/or the database location may be user-configurable. The manifest reader may support multiple databases to allow hierarchical override (e.g. the operating system could ship with a default database, and a user could provide an additional custom database).

Figure 4:
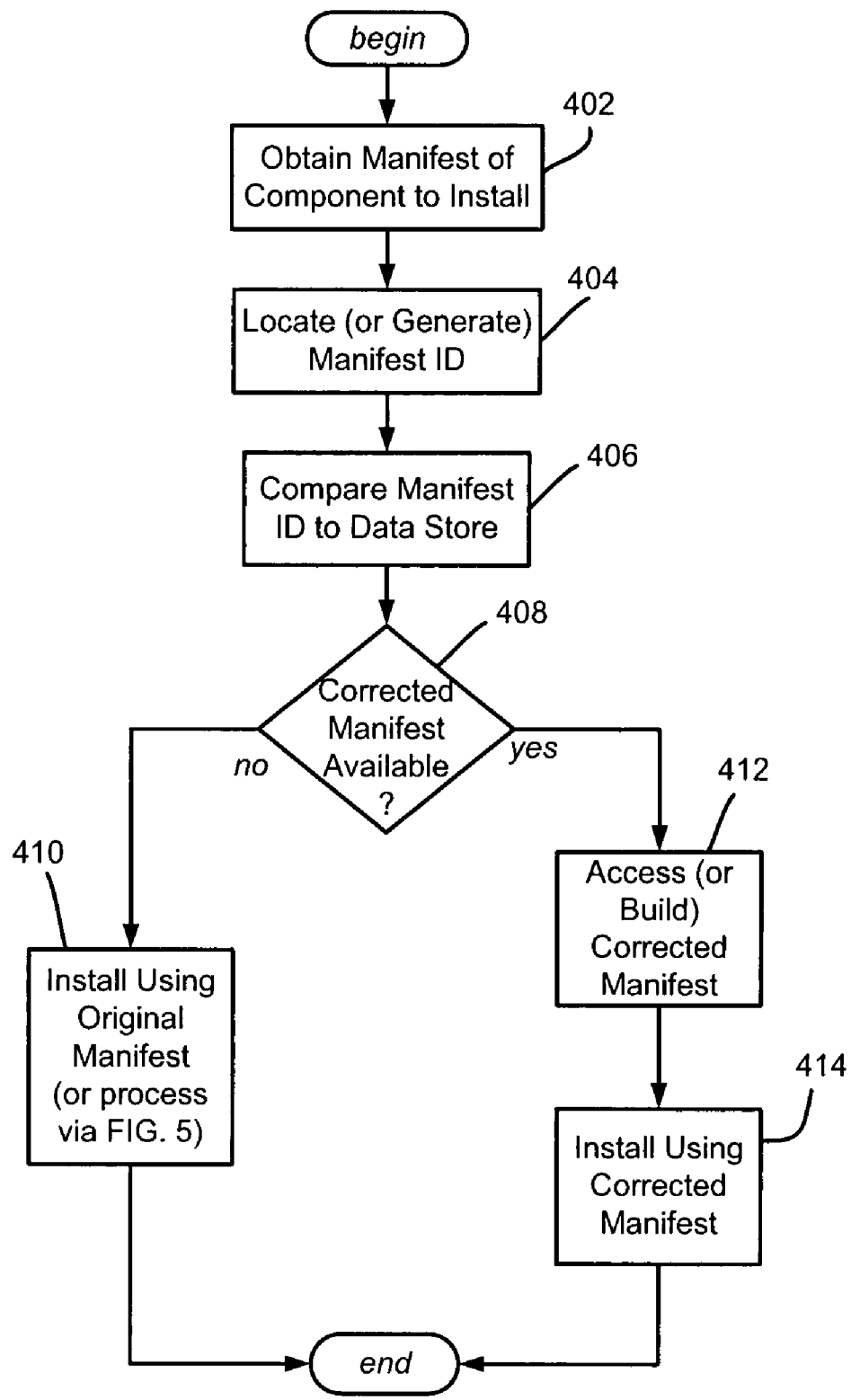
FIG. 4 is a flow diagram representing example steps for dynamically correcting a manifest if a correction is available for use in installation of a software component.
Figure 5:
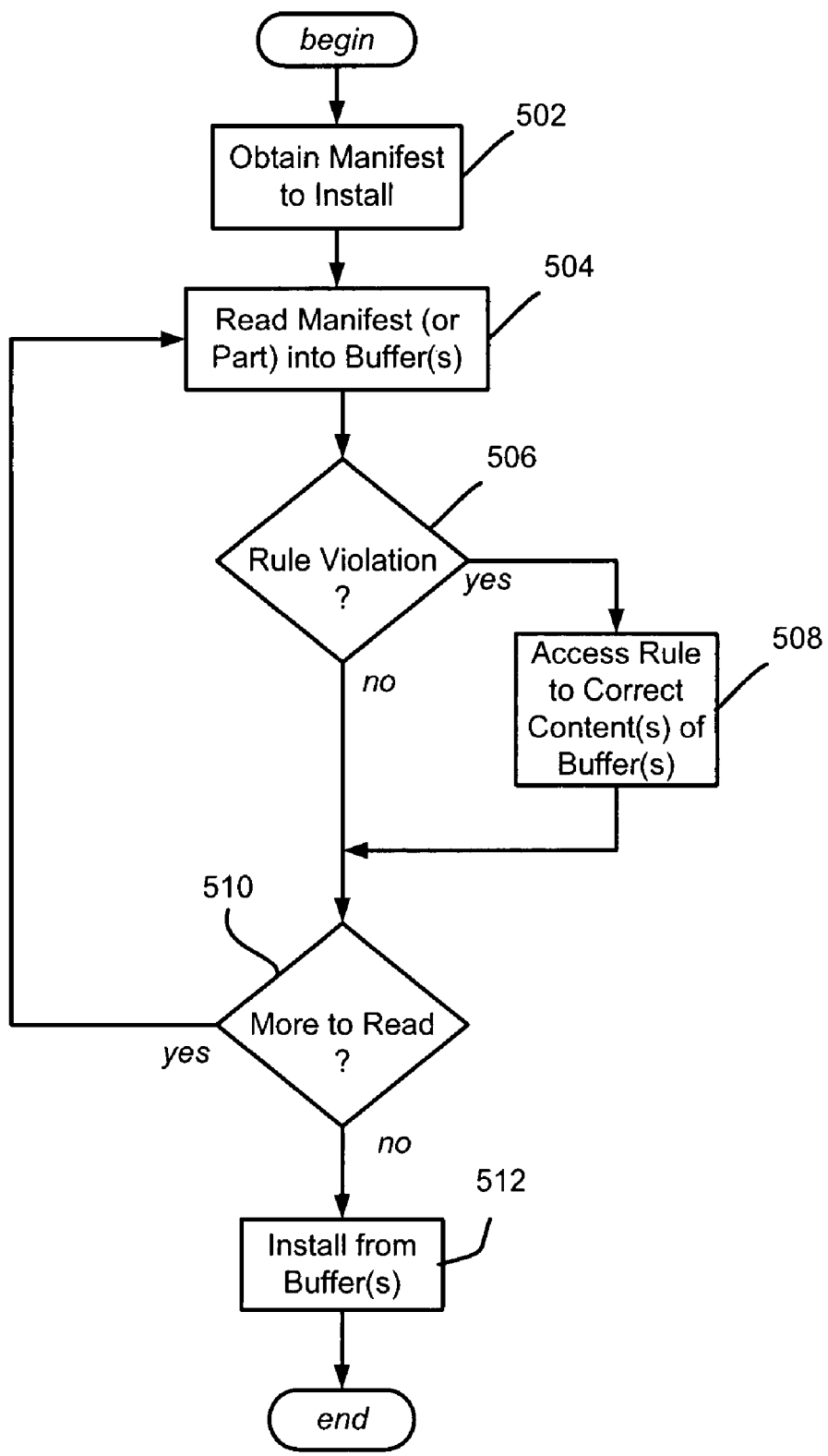
FIG. 5 is a flow diagram representing example steps for checking whether a manifest violates rules, and if so, providing a rules-corrected manifest for use in installation of a software component.

By way of summary, FIGS. 4 and 5 are flow diagrams showing example steps that may be taken to dynamically correct a component manifest. With respect to FIG. 4, as generally described above, upon obtaining a manifest of a component to install (step 402), a first part to dynamically correcting a manifest includes determining whether a corrected manifest (or corresponding data) exists for the original manifest that accompanies the component. Step 404 represents locating the manifest identifier (ID), which may be to generate one via a hash function if no strong ID is associated with the manifest. This may be performed by the parser, or by having the parser provide parsed information to another component (e.g., the manifest reader and/or an installer).

A second aspect, represented via steps 406 and 408, is directed to determining whether the correction data store 112 contains an entry for this particular manifest, among its set of previously-identified erroneous manifests and the respective corrections that need to be made to those manifests. As described above, the data store 112 contains, at a high level, enough information to determine whether a given manifest contains an error, and if so, how to correct the manifest. As also described above, this may be implemented by indexing with the unique identifier of a manifest or generating an identifier via a hash (step 404) if the manifest format used does not have a unique identifier (such as Windows device driver INF files). A complete copy of a corrected version of the manifest may be provided, or a set of deltas between the input manifest and the corrected manifest; either set of data may be compressed.

If no entry is found for the manifest, then the installation is performed using the original manifest, as represented via step 410. Note that rule-checking may be applied before installation, as represented via FIG. 5. If the data store contains an entry, step 412 accesses (or builds via the deltas) the corrected manifest, with installation performed with the corrected manifest as represented by step 414.

FIG. 5 represents example steps that may be performed with respect to rule-checking a manifest for violations (errors) that may be present, such as for detecting typical authoring errors that have simple corrections. Step 502 represents obtaining the manifest to install; note that the steps of FIG. 5 may be performed independent of those of FIG. 4, or in conjunction with FIG. 4, such as following step 410 if no corrected manifest is available for a component-provided one. Further, note that while FIG. 5 is described herein as being a tool used during dynamic correction operations, such as during a software installation or management operation, it can be readily appreciated that such a tool may be used by authors of manifests to check their work, that is, offline before shipping a component.

Step 504 represents reading some part of the manifest into a buffer or the like, which may take place in one pass or in multiple passes. Note that the entire manifest may be read at once, and rules applied thereto, (e.g., to make sure all file and/or their locations are appropriately defined), and/or part of the manifest read at a time, such as to perform a line-by-line syntax check.

Step 506 represents evaluating the read-in portion and any data built therefrom, such as the enumerated file lists. If a violation is detected, step 508 represents correcting the error, such as by fixing the syntax in the buffer, adding a source location of a file, and so forth. Step 510 represents repeating the process until the manifest has been fully processed; note that this may be performed via multiple passes, such as a set of partial reads to fix syntax errors, followed by a full read to fix dependency errors, and so forth.

Once the rule violation and correction pass or passes are complete, the rules-corrected manifest 334 is available. Step 512 represents installing via the rule-corrected manifest, e.g., from the buffer or buffers into which any corrections were made.

Exemplary Operating Environment

Figure 6:
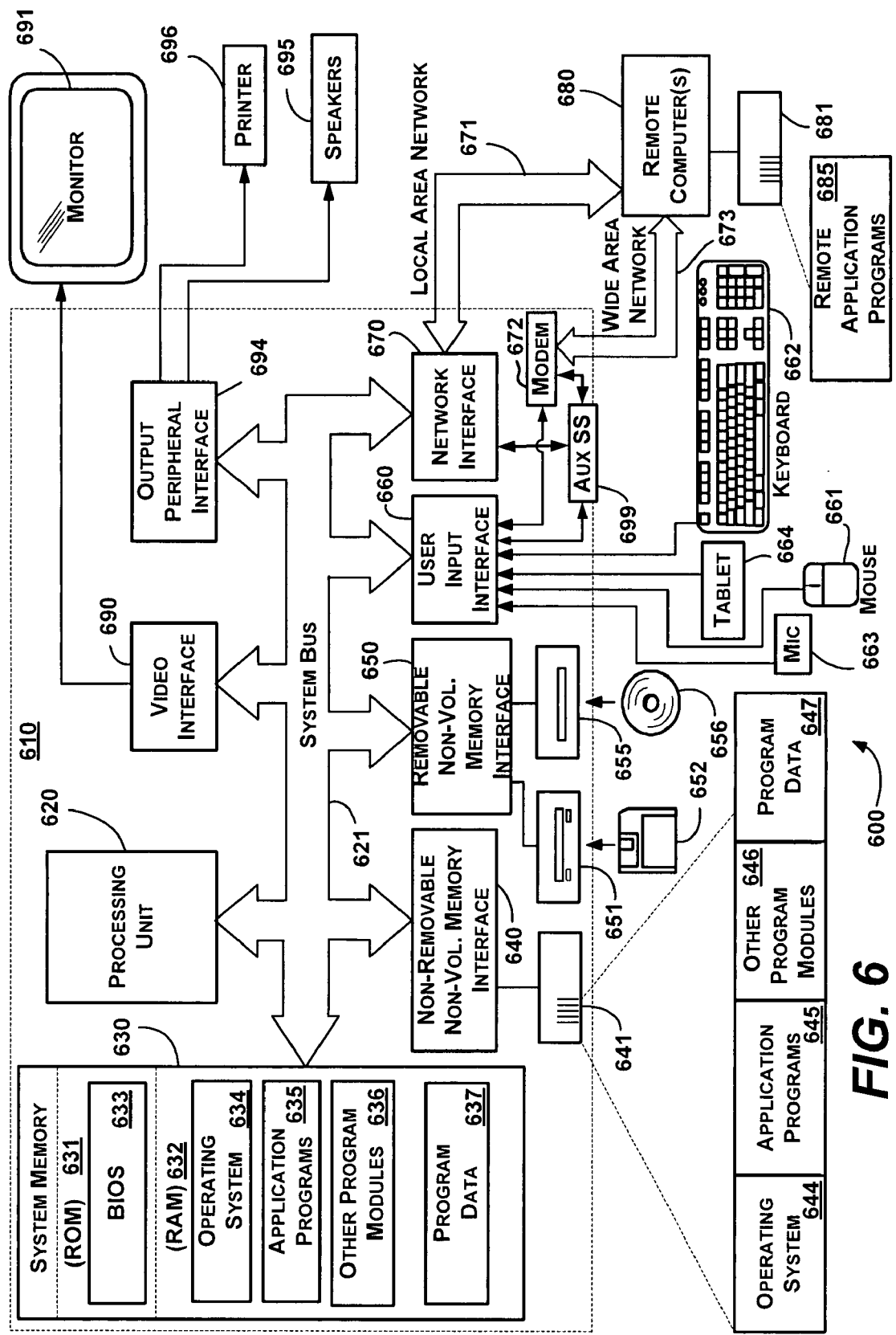
FIG. 6 shows an illustrative example of a general-purpose network computing environment into which various aspects of the present invention may be incorporated.

FIG. 6 illustrates an example of a suitable computing system environment 600 on which the dynamic manifest correction examples represented in FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer storage medium storing computer-executable instructions, which when executed perform a method comprising:
   maintaining a correction data store comprising:
      a set of previously identified manifests, and
      correction information corresponding to each such previously identified manifest in the set;

processing an input manifest to determine whether the input manifest has one or more associated errors by evaluating the input manifest for rule violations, processing the input manifest comprising reading at least a part of the input manifest into a buffer in at least two passes by a set of partial reads to fix syntax errors followed by a full read to fix dependency errors;

determining that the input manifest has one or more associated errors related to at least one rule violation comprising consulting the correction data store; and providing a corrected manifest comprising applying correction information corresponding to a previously identified manifest in the correction data store when the input manifest is determined to have the same identifier as that previously identified manifest, the input manifest contents being changed to fix the at least one rule violation to provide the corrected manifest.

2. The computer storage medium of claim 1 wherein processing the input manifest to determine whether the input manifest has one or more associated errors comprises using the identifier associated with the input manifest to consult the correction data store to determine whether the input manifest is known to require correction.

3. The computer storage medium of claim 2, the method further comprising generating the identifier for the input manifest via a hash function.

4. The computer storage medium of claim 2 wherein consulting the correction data store comprises determining that the input manifest has one or more associated errors, and wherein providing the corrected manifest comprises obtaining the corrected manifest from the correction data store.

5. The computer storage medium of claim 2 wherein consulting the correction data store comprises determining that the input manifest has one or more associated errors, and wherein providing the corrected manifest comprises obtaining a set of one or more deltas from the correction data store and applying the set of one or more deltas to the input manifest to build a corrected manifest.

6. The computer storage medium of claim 2 wherein consulting the correction data store comprises determining that the input manifest has one or more associated errors, and wherein providing the corrected manifest comprises obtaining correction data by following a link to the correction data source, the link being associated with the manifest identifier in the correction data store.

7. The computer storage medium of claim 2, the method further comprising updating the input manifest from the correction data store.

8. The computer storage medium of claim 1 wherein evaluating the input manifest for rule violations comprises accessing the correction data store that includes a set of one or more rules.

9. In a computing environment, a system comprising:
a processing unit operatively coupled to one or more memory;
the one or more memory comprising a correction data store;
the correction data store containing,
  a set of previously identified manifests, and
  correction data associated with each such previously identified manifest in the set; and
the processing unit comprising a manifest reader processing a manifest associated with a software component, the manifest reader accessing the correction data store to determine whether the manifest has at least one associated error by evaluating the manifest for rule violations, and if so, providing the correction data for use by the manifest reader in outputting a corrected manifest in place of the manifest when an identifier associated with the manifest corresponds to an identifier of one of the previously identified manifests in the set, the corrected manifest being outputted by applying a fix to the manifest for at least one rule violation on determining that the at least one associated error is related to the at least one rule violation, processing the manifest associated with the software component comprising reading at least a part of the manifest into a buffer in multiple passes including a set of partial reads to fix syntax errors followed by a full read to fix dependency errors.

10. The system of claim 9 wherein the manifest corresponds to an operating system component manifest file, a device driver INF file, or an installer application MSI file.

11. The system of claim 9 wherein the correction data comprises a substitute corrected manifest, a deltas file which when applied to the manifest outputs the corrected manifest, or a link to a data source containing a substitute corrected manifest or a deltas file.

12. The system of claim 9 wherein the manifest reader is incorporated into an installer that uses the manifest to install the software component.

13. The system of claim 9 wherein the manifest reader accessing the correction data store comprising using the identifier associated with the manifest as an index, including generating the identifier from a hash function if no suitable identifier is otherwise associated with the manifest.

14. The system of claim 9 wherein the correction data store includes a set of one or more rules, and further comprising a rules engine coupled to the manifest reader to determine whether the manifest has one or more associated errors therein by accessing the correction data store.

15. In a computing environment, a method comprising:
determining that a manifest associated with a software component has one or more associated errors by consulting a correction data store, the correction data store comprising a set of previously identified manifests and correction information corresponding to each such previously identified manifest in the set, consulting the correction data store comprising reading at least a part of the manifest into a buffer in at least two passes including a set of partial reads to fix syntax errors followed by a full read to fix dependency errors; and
using a corrected manifest instead of the manifest by accessing the correction information when an identifier associated with the manifest corresponds with an identifier of one of the previously identified manifests in the set, accessing the correction information comprising applying rules corresponding to the correction information, the rules being applied to the manifest for fixing violations within the manifest to correct the manifest for the one or more associated errors.

16. The method of claim 15 wherein accessing the correction information comprises obtaining a substitute corrected manifest from the correction data store, obtaining a set of one or more deltas from the correction data store and applying the set of one or more deltas to the manifest to build a corrected manifest, or following a link to a correction data source from which the corrected manifest is obtained.

17. The computer storage medium of claim 2 wherein the corrected manifest adds a rule set to the correction data store.

18. The method of claim 15 wherein the corrected manifest is used for changing contents of the manifest to fix the violations.

* * * * *